Nov. 18, 1941.   J. STEINER   2,262,974
ARTIFICIAL BAIT
Filed Sept. 9, 1940
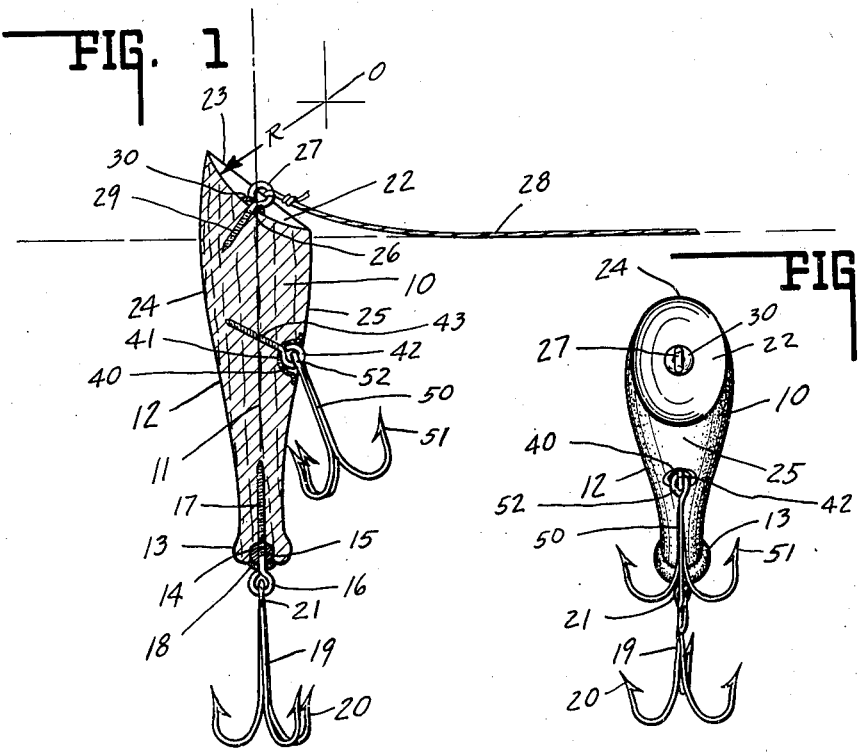
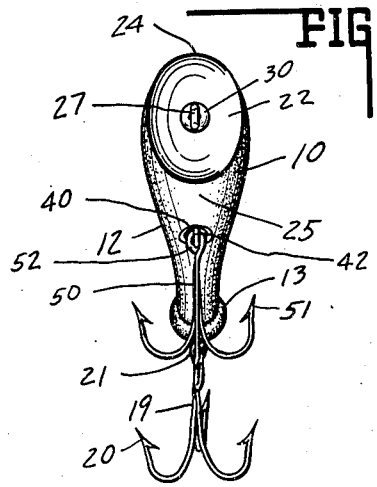
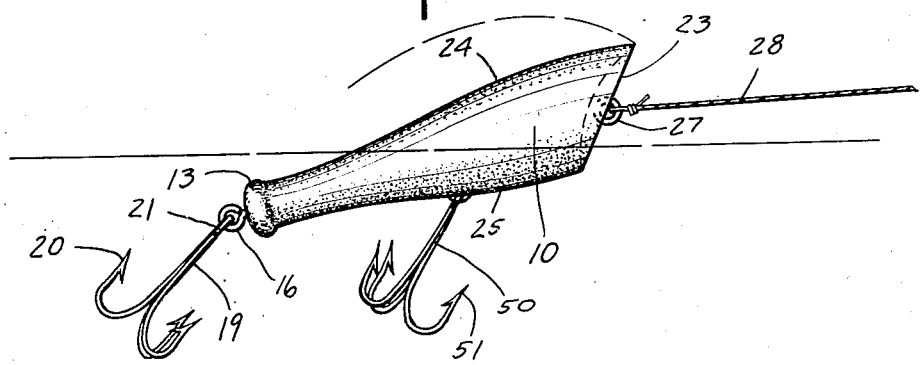
INVENTOR.
JAMES STEINER.
BY Lockwood Goldsmith & Hall
ATTORNEYS.

Patented Nov. 18, 1941

2,262,974

UNITED STATES PATENT OFFICE 2,262,974

ARTIFICIAL BAIT

James Steiner, Anderson, Ind.

Application September 9, 1940, Serial No. 355,955

2 Claims. (Cl. 43—46)

This invention relates to an artificial bait of surface plug type.

The chief object of this invention is to produce a plug bait which when utilized not only simulates a wounded fish, but which produces a peculiar "wake" and, more especially, is of sound producing character.

The chief feature of this invention consists in the formation of the elongated bait body whereby the same is buoyant and streamlined in conformation and, in addition thereto, is weighted at its smaller end so the larger end will remain upright when floating, said larger end having a face biased to the longitudinal axis of the body and of concave character.

The floating level of the body lies slightly below the lower edge of the concave face. When the bait is reeled in, it initially tilts and when the rod is tilted or jerked, the bait creates a popping sound. Continued movement produces a diverging wake and some lateral movement of said body in its forward movement.

The preferable practice of use is to make the cast and take up the slack. During the latter operation the bait assumes a vertical position. Upon initial reeling in, the bait tips or tilts and creates the popping aforementioned when the rod is tilted or jerked. Continued reeling for three or four turns of reel produces the wake and lateral movement referred to. Upon cessation of reeling, the bait reassumes the vertical (floating) position. Thereupon, reeling and jerking is repeated as described and the sequence set forth repeated until the bait is reeled in, whereupon the cast is repeated.

Other objects and features of the invention will be set forth more fully hereinafter.

The full nature of the invention will be understood from the accompanying drawing, the following description and claims.

In the drawing,

Fig. 1 is a central sectional view of the invention in the "floating" position.

Fig. 2 is a front view looking toward biased concave forward face of the bait.

Fig. 3 is a side elevation of the bait when in towed or reeled position.

In the drawing, 10 indicates a plug bait body portion having a central axis 11. The surface of the body is reduced as at 12 toward its lower or rear end, the latter being slightly enlarged as at 13 and recessed as at 14. In said recess is the weight 15 which, even though the buoyant body is larger at the top or front end, maintains, when free floating, said body portion in the position shown in Fig. 1.

A screw eye 16 having the shank portion 17 is threaded in the rear end of the body 10 passing through weight 15 for retention thereof. The shank is coincidental with the longitudinal axis 11. A small washer 18 is interposed between the eye portion of the screw eye 16 and the weight and serves as a bearing for the screw eye when the screw eye is screwed "home." The screw eye 16 supports the hook 19 herein of three-prong character, having barbs 20 and eye mounting portion 21.

The opposite end of body 10 is provided with a biased face, same being inclined between 45 and 50° as shown. Said face 22 is of concave character. 23 indicates the plane of inclination, 24 indicates the longest longitudinal surface element of the body portion and 25 the shortest longitudinal surface element. The plane, including said elements and the axis 11, is the central plane of the body portion.

The numeral 26 indicates the center of the biased concave face. A screw eye 27 has line 28 attached thereto. The shank 29 of said screw eye extends into the plug body 10 at the center 26 and is substantially transverse to the plane of the face. A bearing member 30 may be provided, if desired. In Fig. 1, the letter O indicates the center of the radius R which generates said concave face. This center O is offset from the longitudinal axis 11 and, preferably, lies outside of the plug body and, of course, in the central plane and is closest to the surface element 25.

Preferably, the body portion 10 in transverse section below the biased face is substantially circular in section and the offsetting referred to materially is greater than the radius of any such circular section. The aforesaid relationships appear critical to produce the popping noise.

In the central plane and in the surface element 25 and about one-third distant from the biased face is a socket member 40 seated in recess 41. A screw eye having eye portion 42 nested in the socket member 40 has threaded shank portion 43 extending through the socket member and into the body portion 10. Said shank is substantially transverse to shank 29 and parallel to the biasing plane and lies in the central plane.

A hook 50 of three prong character having barbs 51 has portion 52 secured to the eye portion 42. All of the eye portions lie in the central plane before mentioned.

The initial description of the operation and use of the bait is believed sufficient with the foregoing description of the construction and formation of the invention for a complete understanding of said invention.

While the invention has been illustrated and described in great detail in the foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. An artificial bait including a relatively elongated buoyant body portion arranged for substantially vertical positioning when free floating, the upper end being relatively enlarged and having a concave formation biased relative to the longitudinal axis of the body portion and entirely positioned above the water surface when free floating therein, the lower, narrower end being of weighted character sufficient for such positioning, the concave formation being that generated by a spherical radius, the center of which is offset relative to the longitudinal axis of the body portion, a line anchorage centrally positioned relative to said concave formation and positioned substantially transverse to the biasing plane and included in the center radius of the spherical formation.

2. An artificial bait as defined by claim 1, characterized by the addition of a depending hook structure and an anchorage therefor between the ends of the body portion and included in substantially the shortest longitudinal surface element thereof, and including a screw eye, the line anchorage defined by claim 1 also including a screw eye, the shanks of said screw eyes lying in a plane including the body portion longitudinal axis and being substantially transverse to each other and each being inclined to the longitudinal axis of the body portion.

JAMES STEINER.